United States Patent
Ding (10) Patent No.: US 10,320,919 B2
(45) Date of Patent: Jun. 11, 2019

(54) METHOD, DEVICE, APPARATUS, AND STORAGE MEDIUM FOR GENERATING IDENTIFICATION INFORMATION

(71) Applicant: PING AN TECHNOLOGY (SHENZHEN) CO., LTD., Shenzhen, Guangdong (CN)

(72) Inventor: Lei Ding, Guangdong (CN)

(73) Assignee: PING AN TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 3 days.

(21) Appl. No.: 15/578,229

(22) PCT Filed: Mar. 24, 2017

(86) PCT No.: PCT/CN2017/077979
§ 371 (c)(1),
(2) Date: Nov. 29, 2017

(87) PCT Pub. No.: WO2018/058919
PCT Pub. Date: Apr. 5, 2018

(65) Prior Publication Data
US 2018/0295193 A1    Oct. 11, 2018

(30) Foreign Application Priority Data
Sep. 28, 2016   (CN) .......................... 2016 1 0859359

(51) Int. Cl.
*G06F 15/173* (2006.01)
*H04L 29/08* (2006.01)
(Continued)

(52) U.S. Cl.
CPC ............ *H04L 67/146* (2013.01); *G06F 21/44* (2013.01); *G06F 21/73* (2013.01); *H04L 43/08* (2013.01);
(Continued)

(58) Field of Classification Search
CPC ..... G06F 15/177; G06F 8/61; H04L 41/0803; H04L 67/34; H04W 8/24
See application file for complete search history.

(56) References Cited

U.S. PATENT DOCUMENTS 9,477,635 B1 * 10/2016 Kuscher ................ G06F 15/177
2014/0025469 A1 * 1/2014 Mishuku ............ G06C 30/0225
705/14.26
(Continued)

FOREIGN PATENT DOCUMENTS

| CN | 104811931 A | 7/2015 |
| CN | 105242951 A | 1/2016 |
| JP | 2007265250 A * | 10/2007 |

OTHER PUBLICATIONS

International Search Report for PCT/CN2017/077979, dated Jun. 28, 2017, 5 pages.
(Continued)

*Primary Examiner* — Shean Tokuta
(74) *Attorney, Agent, or Firm* — Hauptman Ham, LLP (57) ABSTRACT

A method for generating identification information is disclosed including: when a terminal receiving a data acquisition instruction from a server, and then collecting data according to the data acquisition instruction; storing the data, and updating the data to the server to enable the server to issue a rule of generating identification information, to generate the identification information of the terminal; storing the identification information of the terminal that could be used as current identification information when install application action is detected. A device for generating identification information having the same is disclosed. The rule of generating identification information issued by the server and the data collected by the terminal are invariant, and
(Continued)

hence the obtained identification information is invariant, ensuring the stability of generating identification information.

15 Claims, 8 Drawing Sheets

(51) Int. Cl.
  *G06F 21/44*     (2013.01)
  *G06F 21/73*     (2013.01)
  *H04L 12/26*     (2006.01)
  *H04L 29/12*     (2006.01)
  *H04L 29/06*     (2006.01)

(52) U.S. Cl.
  CPC ........ *H04L 61/6022* (2013.01); *H04L 67/303* (2013.01); *H04L 67/34* (2013.01); *G06F 2221/2129* (2013.01); *H04L 63/0876* (2013.01)

(56) References Cited

U.S. PATENT DOCUMENTS

| | | | |
|---|---|---|---|
| 2015/0347112 A1* | 12/2015 | Kosmynka | G06Q 30/0201 717/176 |
| 2016/0042311 A1* | 2/2016 | Wei | G06Q 10/087 705/28 |
| 2016/0112830 A1* | 4/2016 | Soon | H04W 4/02 455/456.1 |
| 2017/0208137 A1* | 7/2017 | Kirkpatrick | G06F 8/61 |

OTHER PUBLICATIONS

Written Opinion for PCT/CN2017/077979, dated Jun. 28, 2017, 7 pages.

* cited by examiner

METHOD, DEVICE, APPARATUS, AND STORAGE MEDIUM FOR GENERATING IDENTIFICATION INFORMATION

This application claims priority to Chinese Patent Application No. 201610859359.3, entitled "METHOD AND DEVICE FOR GENERATING IDENTIFICATION INFORMATION" filed on Sep. 28, 2016, the contents of which is expressly incorporated by reference herein in its entirety.

FIELD OF THE INVENTION

The present disclosure relates to fields of communication technologies, and in particular to a method, device, apparatus, and computer-readable storage medium for generating identification information.

BACKGROUND OF THE INVENTION

Universally Unique Identifier (as abbreviated as UUID) is identification information formed at the terminal, ensuring each terminal to be unique in the same space time. Generally speaking, UUID is generated when running for the first time after application programs are installed. More specifically, when the application programs run for the first time, the terminal invokes application programming interface (as abbreviated as API) to generate UUID according to the random numbers of API. Since the terminal includes multiple applications, and the terminal would recall the API when re-installing and re-operating each application, the obtained UUID would change, that means, UUID would change while re-installing applications. Apparently, the UUID generated is unstable in above way.

SUMMARY OF THE INVENTION

The present disclosure discloses a method, device, apparatus, and computer-readable storage medium for generating identification information, aiming to solve the technical problem that flexibility of identification information generated in conventional way is comparatively poor.

The method for generating identification information includes:

when a terminal receives a data acquisition instruction from a server, then collecting data according to an data acquisition instruction;

storing the collected data, and updating the data to the server, hence allowing the server to issue a rule of generating identification information;

generating the identification information of the terminal according to the data and the rule of generating identification information when the rule of generating identification information from the server is received;

storing the identification information such that the stored identification information become current identification information if later an instruction of installing application is detected, wherein if the rule of generating the identification information is invariant, the identification information is invariant.

The device for generating identification information includes:

a collection module, configured for collecting data according to a data acquisition instruction when receiving the data acquisition instruction from the server;

a storage module, configured for storing the collected data;

an update module, configured for updating the data to the server, allowing the server to issue a rule of generating identification information;

a generation module, configured for generating the identification information of the terminal according to the data and the rule of generating identification information when the rule of generating identification information issued by the server is received;

the storage module being further configured for storing the generated identification information; and a process module, configured for using the stored identification information being current identification information if an instruction of installing application is detected, wherein, if the rule of generating the identification information is invariant, the identification information is invariant.

The apparatus for generating identification information includes a processor, a network interface, and a storage medium;

the storage medium stores an identification information generation program;

the network interface is connected with a server and communicating with the server, wherein the server stores a rule of generating identification information;

the processor is configured for executing the identification information generation program to perform following steps:

when a terminal receives a data acquisition instruction from the server, collecting data according to the data acquisition instruction;

storing the collected data, and updating the data to the server, allowing the server to issue a rule of generating identification information;

generating the identification information of the terminal according to the data and the rule of generating identification information when the rule of generating identification information from the server is received; and storing the identification information such that the stored identification information becomes current identification information if later an instruction of installing application is detected, wherein, if the rule of generating the identification information is invariant, the identification information is invariant.

The storage medium provided in the present disclosure has one or more programs stored thereon, which, when being executed by one or more processors, cause the one or more processors to perform following steps:

when a terminal receives a data acquisition instruction from a server, collecting data according to the data acquisition instruction;

storing the collected data, and updating the data to the server, allowing the server to issue a rule of generating identification information;

generating the identification information of the terminal according to the data and the rule of generating identification information when the rule of generating identification information from the server is received; and storing the identification information such that the stored identification information becomes current identification information if later an instruction of installing application is detected, wherein, if the rule of generating the identification information is invariant, the identification information is invariant.

The method, system, device, and computer-readable storage medium for generating identification information disclosed by the present disclosure, when the terminal receives the data acquisition instruction from the server, the terminal collects the data according to the data acquisition instruction, then stores the data and updates the data to the server, to allow the server to issue the rule of generating identification information. When the rule of generating identification information issued by the server is received, generating the identification information of the terminal according to the data and rule of generating identification information, at last storing the generated identification information such that the stored identification information becomes current identification information if later an instruction of installing applications is detected, rather than invoking random numbers of API to generate new identification information randomly during re-installing applications. In the present disclosure, if the rule of generating identification information issued by the server and data collected by the terminal are invariant, the generated identification information is invariant, ensuring the stability of generating identification information.

Objective achieving, function features, and advantages of the present disclosure are further described with reference to the embodiments and the accompany drawings.

DETAILED DESCRIPTION OF THE EMBODIMENTS

Technical solutions of the present invention are further described in detail with reference to the accompanying drawings and embodiments. It is to be understood that the specific embodiments described herein are merely used for describing the present invention, but are not intended to limit the present invention.

The present disclosure relates to a method for generating identification information.

Figure 1:
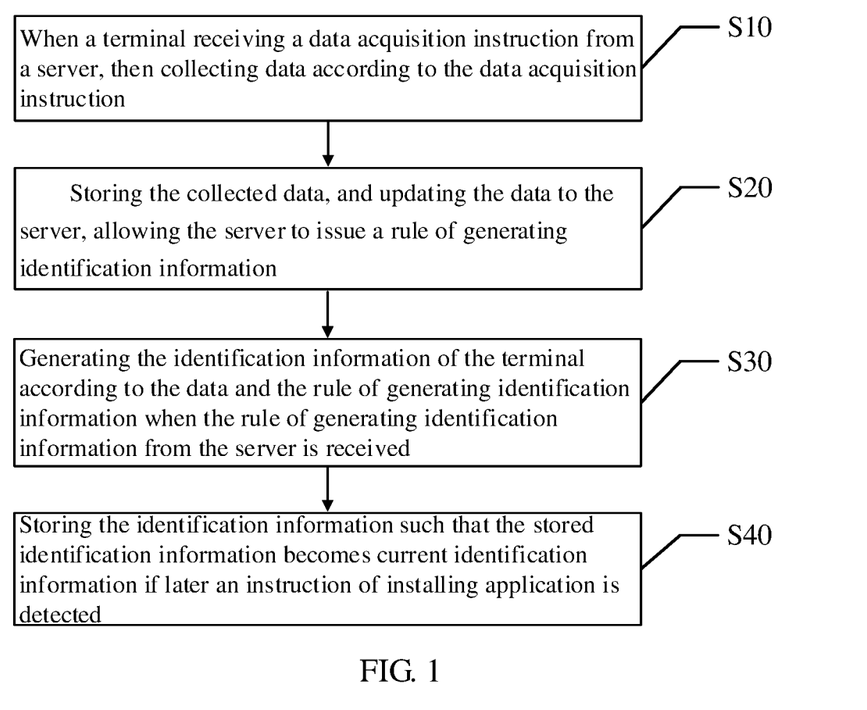
FIG. 1 is a flow chat of a method for generating identification information of a first embodiment of the present disclosure.

With reference to FIG. 1, FIG. 1 is a flow chat of a method for generating identification information of the first embodiment of the present disclosure.

In the embodiment, the method for generating identification information includes:

step S10, collecting data, when a terminal receiving a data acquisition instruction from a server, according to the data acquisition instruction;

step S20, storing the collected data, and updating the data to the server, hence allowing the server to issue a rule of generating identification information;

step S30, generating the identification information of the terminal according to the data and the rule of generating identification information when the rule of generating identification information from the server is received; and step S40, storing the generated identification information such that the stored identification information becomes current identification information if later an instruction of installing application is detected, wherein, if the rule of generating the identification information is invariant, the identification information is invariant.

In the embodiment, when the terminal receives the data acquisition instruction from the server, collects the data according to the data acquisition instruction, then stores the collected data and updates the data to the server, to allow the server to issue the rule of generating identification information, meanwhile, generating identification information according to the data and the issued rule of generating identification information when the rule of generating identification information issued by the server is received, therefore, generating the identification information of the terminal, in this case, the data includes configuration parameters, IP information and the MAC address of the terminal etc.

In the embodiment, under the circumstances that the collected data is the MAC address of a terminal, the step S30 includes steps as follows.

Firstly, if the rule of generating identification information is directly using the MAC address of the terminal, the MAC address of the terminal is the current identification information of the terminal.

In the embodiment, if the rule of generating identification information is: directly using the MAC address of the terminal, then the MAC address of the terminal is the current identification information of the terminal.

Secondly, if the rule of generating identification information is encrypting the MAC address of the terminal, then encrypting the MAC address of the terminal by means of a pre-stored encryption algorithm, to generate the identification information of the terminal.

In the embodiment, if the rule of generating identification information is: encrypting the MAC address of the terminal, determining the encryption algorithm beforehand, then encrypting the MAC address of the terminal by means of the pre-stored encryption algorithm, to generate the identification information of the terminal. In this case, the encryption algorithm includes message digest algorithm 5 (shorten as MD5) and base 64 etc.

In the embodiment, taking base 64 as the pre-stored encryption algorithm for an example, if the encryption algorithm is base 64, firstly extracting bytes of the MAC address of the terminal, then converting continuous three 8-bytes (3*8=24) into four 6-bytes (4*6=24), afterward adding two zeroes before each 6-bytes to form one 8-bytes.

To understand better, examples are given as follows.

A current character string "11010101-11000101-00110011" is converted to obtain the character string "110101-011100-010100-110011", and adding two zeroes before each 6-bytes to obtain the character string "00110101-00011100-00010100-00110011".

Therefore, by means of above ways, encrypting the MAC address of the terminal is realized to generate the identification information of terminal.

It is to be understood that the abovementioned two ways for generating the identification information of terminal are merely exemplary, persons of ordinary skill in the art use an equivalent structural or equivalent process alternation made by using the content of the specification and drawings of the present invention, or an application of the content of the specification and drawings directly or indirectly to another related technical field, shall fall within the protection scope of the present invention.

After the identification information is generated, storing the generated identification information to a pre-stored memory. Only if the rule of generating identification information is invariant, the identification information of the terminal is invariant. The stored identification information is used as the current identification information if later an instruction of installing application is detected, without re-generation of the identification information.

That means, the identification information of the terminal is generated by the data collected by the terminal and the rule of generating identification information issued by the server, only if the data collected by the terminal is invariant as well as the rule of generating identification information issued by the server is invariant, the identification information of the terminal would be invariant. Each terminal includes a plurality of applications, but the identification information received by each application is the same. Even if some applications are unloaded and then re-installed, or the terminal is re-brushed, which no needs to generate new identification information, ensuring the stability and uniqueness of the identification information of the terminal.

The method for generating identification information of the terminal disclosed by the embodiment, when the terminal receives the data acquisition instruction from the server, collecting the data according to the data acquisition instruction, then storing the collected data and updating the data to the server, which allows the server to issue the rule of generating identification information. When the rule of generating identification information issued by the server is received, generating the identification information of the terminal according to the data and the rule of generating identification information, finally storing the identification information such that the stored identification information becomes current identification information if later the instruction of installing applications is detected, rather than invoking random numbers of API to generate new identification information randomly during re-installing applications. In the present disclosure, if the rule of generating identification information issued by the server and data collected by the terminal are invariant, the generated identification information is invariant, ensuring the stability of generating identification information.

Figure 2:
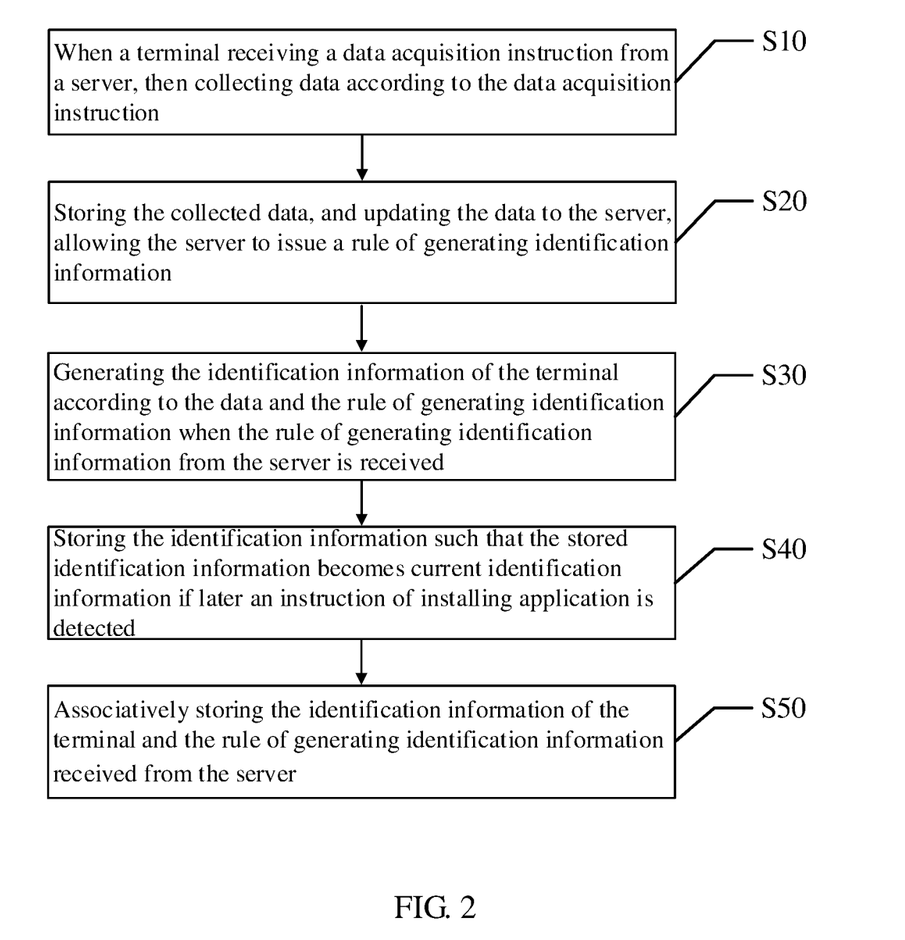
FIG. 2 is a flow chat of the method for generating identification information of a second embodiment of the present disclosure.

Furthermore, with reference to FIG. 2, based on the first embodiment, a method for generating identification information of a second embodiment is provided, further including a step S50 after the step S30.

Step S50, associatively storing the identification information of the terminal and the rule of generating identification information received from the server.

In the embodiment, after the terminal generating the identification information, associative storing the identification information of the terminal and the rule of generating identification information to a location, the location may be a local file, or the keychain of the terminal.

So it is understandable that associatively storing the identification information of the terminal and the rule of generating identification information received from the server, later only if the rule of generating identification information issued by the server is invariant, the terminal may use the identification information directly without changes, that is suitable for every application, so as to avoid generating identification information more than once and ensure the stability and uniqueness of generating identification information.

Figure 3:
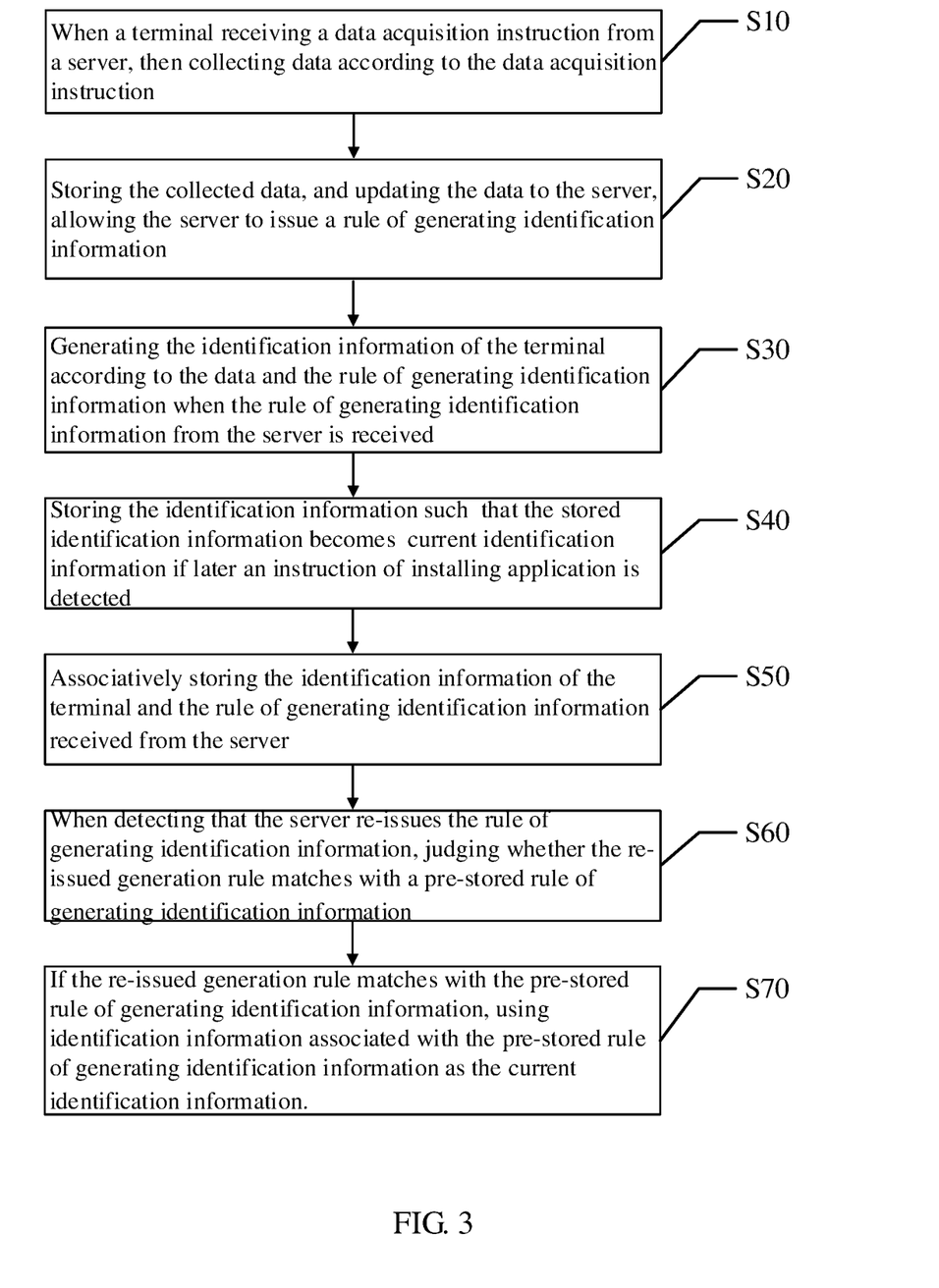
FIG. 3 is a flow chat of the method for generating identification information of a third embodiment of the present disclosure.

Furthermore, with reference to FIG. 3, based on the second embodiment, a method for generating identification information of a third embodiment is provided, further including a step S60 and a step 70 after the step S50.

The step S60, when detecting that the server re-issues the rule of generating identification information, judging whether the re-issued generation rule matches with a pre-stored rule of generating identification information.

The step S70, if the re-issued rule of generating identification information matches with the pre-stored rule of generating identification information, using identification information associated with the pre-stored rule of generating identification information as the current identification information.

In the embodiment, after the terminal associatively stores the identification information of the terminal and the rule of generating identification information, during operation, if detecting that the server re-issues the rule of generating identification information, the terminal firstly judges whether the re-issued generation rule matches with the pre-stored rule of generating identification information, more specifically, comparing the re-issued generation rule with the pre-stored rule of generating identification information where if the re-issued generation rule matches with the pre-stored rule of generating identification information, it means the rule of generating identification information hasn't been changed, thus the identification information associated with the pre-stored rule of generating identification information may be used as the current identification information directly.

Generally speaking, the rule of generating identification information pre-stored in the server is invariant, thus the identification information of the terminal is invariant. Whereas, the server may update the rule of generating identification information and re-issue the updated rule to the terminal, to avoid the identification information of the terminal gets out to reduce security of using the identification information.

In the embodiment, like before the server re-issues the rule of generating identification information, the terminal judges whether the rule of generating identification information is changed, if not, the terminal may still use the previous identification information without altering. Thus, the identification information of terminal keeps pace with the rule of generating identification information to ensuring the stability and uniqueness of the identification information of terminal.

Figure 4:
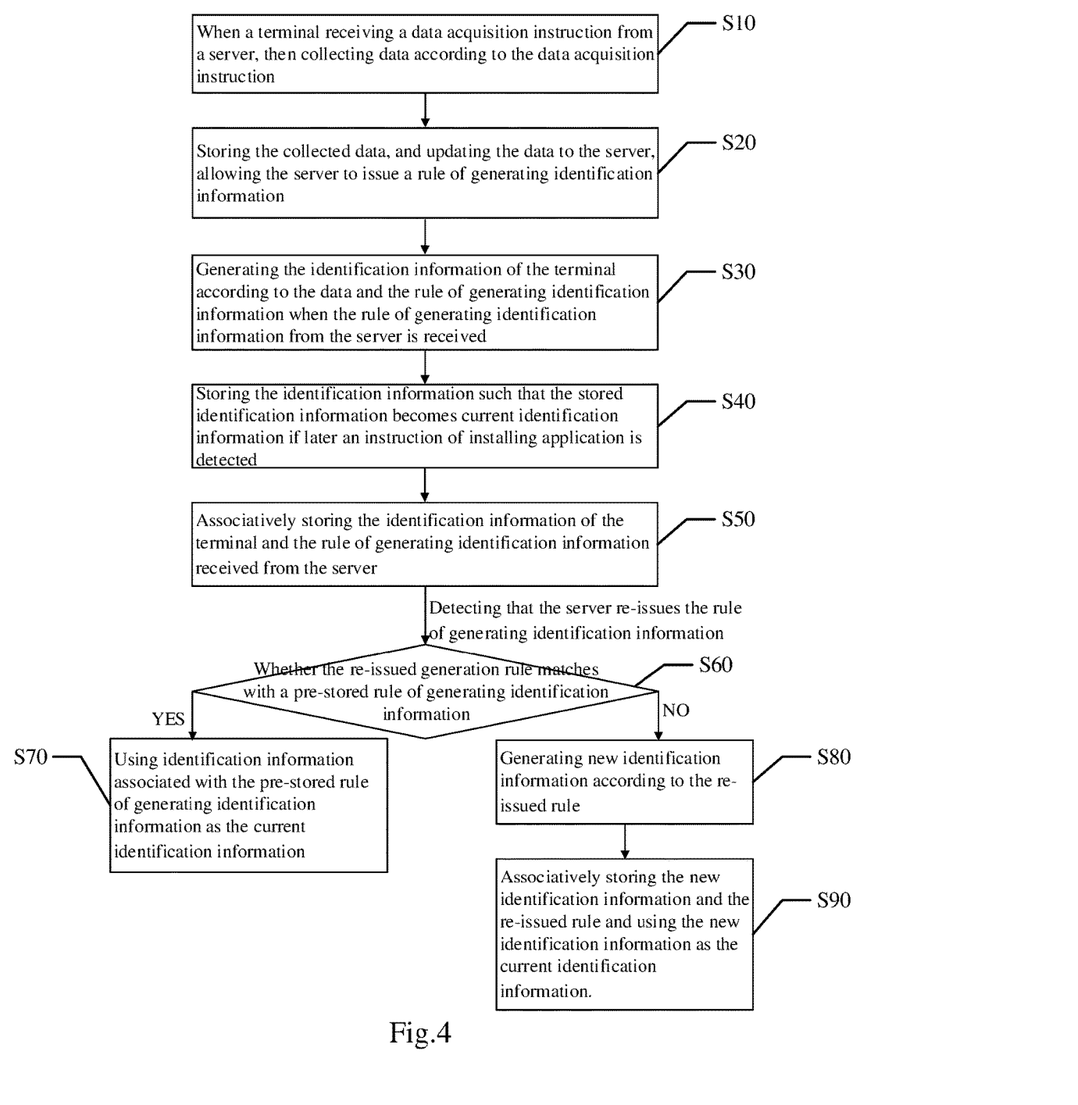
FIG. 4 is a flow chat of the method for generating identification information of a fourth embodiment of the present disclosure.

Furthermore, with reference to FIG. 4, based on the third embodiment, a method for generating identification information of a fourth embodiment is provided, further including a step S80 and a step S90 after the step S50.

The step S80, if the re-issued rule fails to match with the pre-stored rule of generating identification information, then generating new identification information according to the re-issued rule.

The step S90, associatively storing the new identification information and the re-issued rule, and using the new identification information as the current identification information.

In the embodiment, after comparing the re-issued rule of generating identification information with the pre-stored rule of generating identification information, if the re-issued rule failure to match with the pre-stored rule is detected, that means the background rule of generating identification information of the server has been updated, at this time, the terminal re-issues the rule of generating identification information, collects data to generate the new identification information. Meanwhile, associatively storing the new identification information and the re-issued rule of generating identification information, meanwhile the new identification information is used as the current identification information. In that case, the previous identification information can be continuously stored or canceled directly.

In the embodiment, when re-issued rule fails to match with the pre-stored rule, the terminal generates new identification information and the new identification information is used as the current identification information, ensuring the identification information of the terminal changes with the change of rule of generating identification information.

The present disclosure further provides a device for generating identification information.

Figure 5:
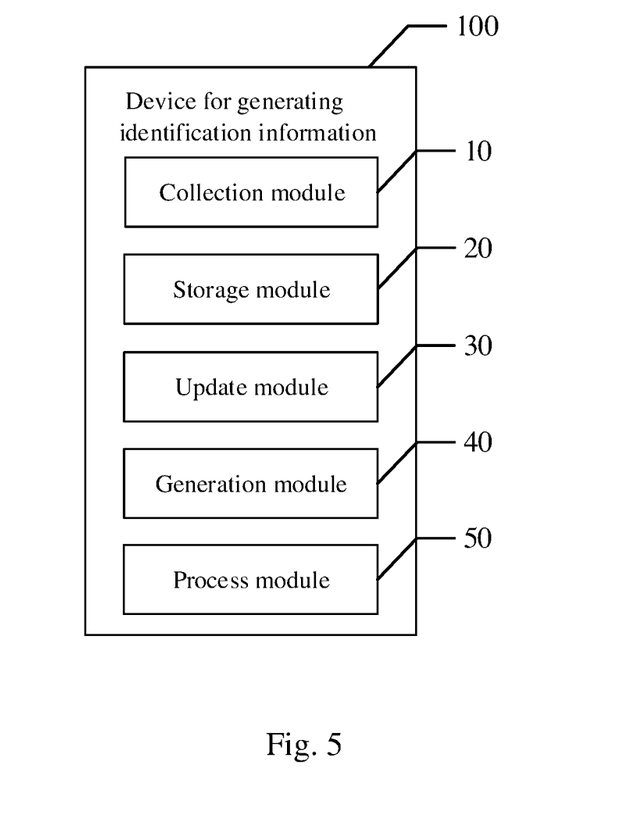
FIG. 5 is a block diagram illustrating a device for generating identification information of a first embodiment of the present disclosure.

With reference to FIG. 5, FIG. 5 is a block diagram illustrating a device 100 for generating identification information of the first embodiment of the present disclosure.

It needs to illustrate, for persons skilled in the prior art, FIG. 5 only shows an embodiment of the present disclosure, the persons skilled in the prior art may easily get around the functional modules in the device 100 for generating identification information as shown in FIG. 5, adding new functional modules. Each user-defined functional module is only used to help understand each functional module in the device 100 for generating identification information, without limiting technical schemes of the present disclosure. The technical core of the present disclosure is functions that each user-defined functional module is used to realize.

In the embodiment, the device 100 for generating identification information includes:

a collection module 10, configured for collecting data according to a data acquisition instruction when receiving the data acquisition instruction from the server;

a storage module 20, configured for storing the collected data;

an update module 30, configured for updating the data to the server, allowing the server to issue a rule of generating identification information;

a generation module 40, configured for generating the identification information of the terminal according to the data and the rule of generating identification information when the rule of generating identification information issued by the server is received;

the storage module 20 being further configured for storing the generated identification information; and a process module 50, configured for using the stored identification information as the current identification information if an instruction of installing application is detected, wherein, if the rule of generating the identification information is invariant, the identification information is invariant.

In the embodiment, when receiving the data acquisition instruction from the server, the collection module 10 collects the data according the data acquisition instruction, then the storage module 20 stores the collected data, the update module 30 updates the collected data to the server, to allow the server issuing the rule of generating identification information. When the rule of generating identification information is received, the generation module 40 may generate the identification information of the terminal according to the collected data and issued rule of generating identification information. In which, the data includes configuration parameters, IP information and the MAC address of the terminal etc.

In the embodiment, when the collected data is the MAC address of a terminal, the generation module 40 generating the identification information includes steps as follows.

Firstly, if the rule of generating identification information is directly using the MAC address of the terminal, the MAC address of the terminal is the current identification information of the terminal.

In the embodiment, if the rule of generating identification information is: directly using the MAC address of the terminal, then the generation module 40 uses the MAC address of the terminal as the current identification information of the terminal.

Secondly, if the rule of generating identification information is encrypting the MAC address of the terminal, then encrypting the MAC address of the terminal by means of a pre-stored encryption algorithm, to generate the identification information of the terminal.

In the embodiment, if the rule of generating identification information is: encrypting the MAC address of the terminal, the generation module 40 determines the encryption algorithm beforehand, then encrypts the MAC address of the terminal by means of the pre-stored encryption algorithm, to generate the identification information of the terminal. In this embodiment, the encryption algorithm includes message digest algorithm 5 (shorten as MD5) and base 64 etc.

In the embodiment, taking base 64 as the pre-stored encryption algorithm for an example, if the encryption algorithm is base 64, firstly extracting bytes of the MAC address of the terminal, then converting continuous three 8-bytes (3*8=24) into four 6-bytes (4*6=24), afterward adding two zeroes before each 6-bytes to form one 8-bytes.

To understand better, examples are given as follows:

A current character string "11010101-11000101-00110011" is converted to obtain the character string "110101-011100-010100-110011", and adding two zeroes before each 6-bytes to obtain the character string "00110101-00011100-00010100-00110011".

Therefore, by means of above ways, the generation module 40 encrypts the MAC address of the terminal to generate the identification information of terminal.

It is to be understood that the abovementioned two ways for generating the identification information of terminal are merely exemplary, persons of ordinary skill in the art use an equivalent structural or equivalent process alternation made by using the content of the specification and drawings of the present invention, or an application of the content of the specification and drawings directly or indirectly to another related technical field, shall fall within the protection scope of the present invention.

After the generation module 40 generates the identification information, the storage module 20 stores the generated identification information to a pre-stored memory. Only if the rule of generating identification information is invariant, the identification information of the terminal is invariant. The process module 50 uses the stored identification information as the current identification information if later an instruction of installing application is detected, without re-generation of the identification information.

That means, the identification information of the terminal is generated by the data collected by the terminal and the rule of generating identification information issued by the server, only if the data collected by the terminal is invariant as well as the rule of generating identification information issued by the server is invariant, the identification information of the terminal would be invariant. Each terminal includes a plurality of applications, but the identification information received by each application is the same. Even if some applications are unloaded and then re-installed, or the terminal is re-brushed, which no needs to generate new identification information, ensuring the stability and uniqueness of the identification information of the terminal.

The device 100 for generating identification information disclosed by the embodiment, when the collection module 10 receives the data acquisition instruction from the server, collecting the data according to the data acquisition instruction, the storage module 20 stores the collected data and updating the data to the server, which allows the server to issue the rule of generating identification information. When the rule of generating identification information issued by the server is received, the generation module 40 generates the identification information of the terminal according to the data and the rule of generating identification information, finally the storage module 20 stores the identification information that the process module 50 will use as the current identification information if later the instruction of installing applications is detected, rather than invoking random numbers of API to generate new identification information randomly during re-installing applications. In the present disclosure, if the rule of generating identification information issued by the server and data collected by the terminal are invariant, the generated identification information is invariant, ensuring the stability of generating identification information.

Figure 6:
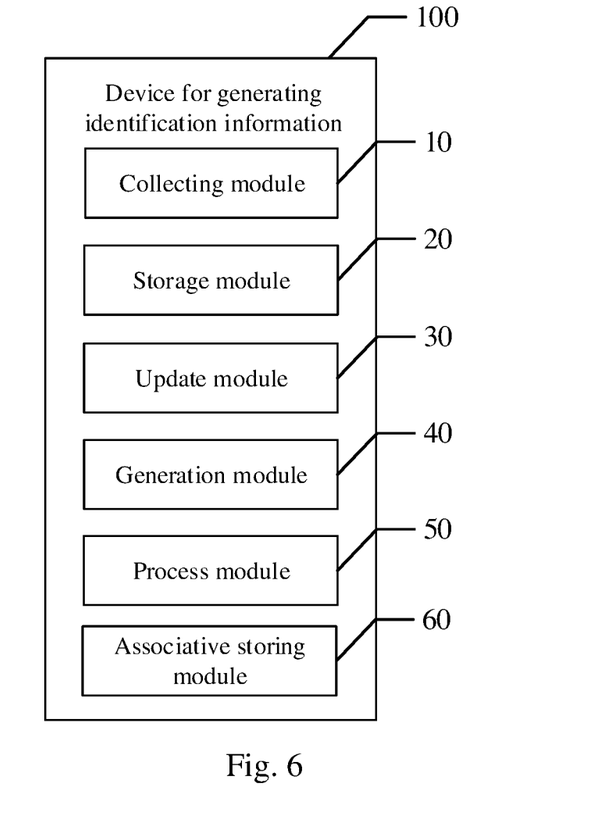
FIG. 6 is a block diagram illustrating a device for generating identification information of a second embodiment of the present disclosure.

Furthermore, with reference to FIG. 6, according to the first embodiment, the device 100 for generating identification information of the second embodiment further includes an association storing module 60 configured for associatively storing the identification information of the terminal and the rule of generating identification information received from the server.

In the embodiment, after the generation module 40 generates the identification information, the association storing module 60 associatively stores the identification information of the terminal and the rule of generating identification information to a location, the location may be a local file, or the keychain of the terminal.

So it is understandable that associatively storing the identification information of the terminal and the rule of generating identification information received from the server, later only if the rule of generating identification information issued by the server is invariant, the device of generating identification information may use the identification information directly without changes, that is suitable for every application, so as to avoid generating identification information more than once and ensure the stability and uniqueness of generating identification information.

Figure 7:
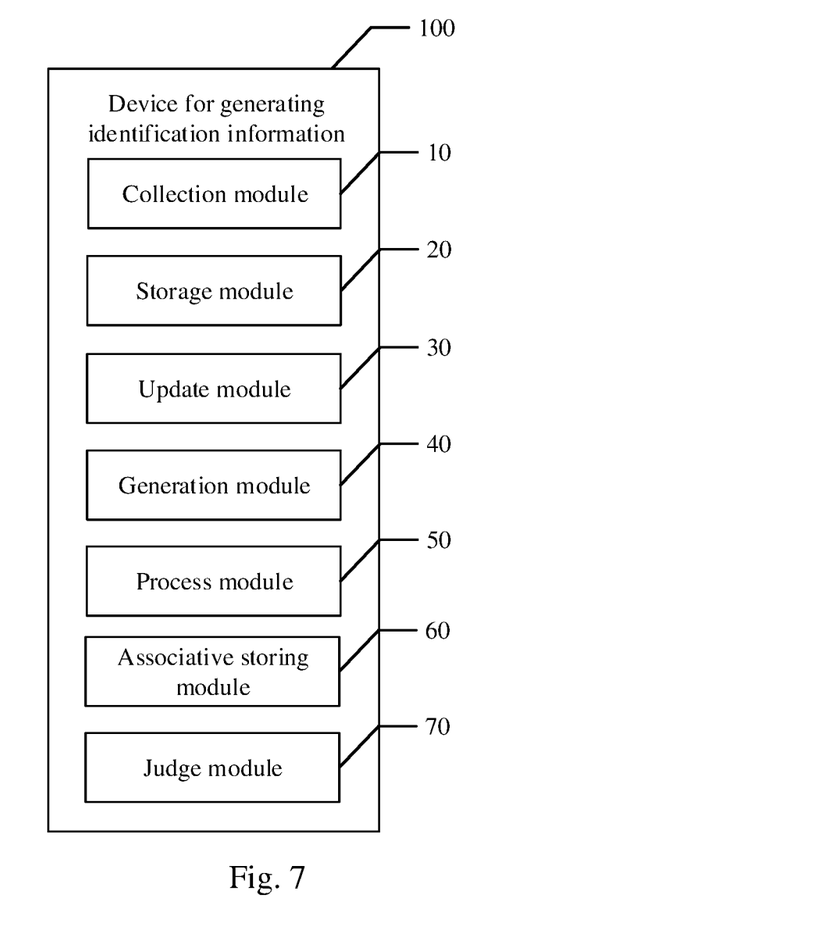
FIG. 7 is a block diagram illustrating a device for generating identification information of a third embodiment of the present disclosure.

Furthermore, with reference to FIG. 7, according to the second embodiment, the device 100 for generating identification information of the third embodiment further includes a judge module 70.

The judge module 70 is configured for, when detecting that the server re-issues the rule of generating identification information, judging whether the re-issued generation rule matches with a pre-stored rule of generating identification information.

The process module 50 is configured for, if the re-issued rule of generating identification information matches with the pre-stored rule of generating identification information, using identification information associated with the pre-stored rule of generating identification information as the current identification information.

In the embodiment, after the associative module 60 associatively stores the identification information of the terminal and the rule of generating identification information, during operation, if detecting that the server re-issues the rule of generating identification information, the judge module 70 firstly judges whether the re-issued generation rule matches with the pre-stored rule of generating identification information. In an embodiment, the judge module 70 compares the re-issued generation rule with the pre-stored rule of generating identification information; if the re-issued generation rule matches with the pre-stored rule of generating identification information, it means the rule of generating identification information hasn't been changed, thus the process module 50 may use the identification information associated with the pre-stored rule of generating identification information as the current identification information.

Generally speaking, the rule of generating identification information pre-stored in the server is invariant, thus the identification information of the terminal is invariant. Whereas, the server may update the rule of generating identification information and re-issue the updated rule to the device 100 for generating identification information, to avoid the identification information of the terminal gets out to reduce security of using the identification information.

In the embodiment, like before the server re-issues the rule of generating identification information, the terminal judges whether the rule of generating identification information is changed, if not, the terminal may still use the previous identification information without altering. Thus, the identification information of terminal keeps pace with the rule of generating identification information to ensure the stability and uniqueness of the identification information of the terminal.

Furthermore, the device 100 for generating identification information of the fourth embodiment according to the third embodiment further includes: the generation module 40 is further configured for if the re-issued rule fails to match with the pre-stored rule of generating identification information, then generating new identification information according to the re-issued rule.

The association storing module 60 is further configured for associatively storing the new identification information and the re-issued rule.

The process module 50 is further configured for using the new identification information as the current identification information.

In the embodiment, after comparing the re-issued rule of generating identification information with the pre-stored rule of generating identification information, if it is detected that the re-issued rule fails to match with the pre-stored rule, it means that the background rule of generating identification information of the server has been updated. At this time, according to the re-issues the rule of generating identification information and collected data, the generation module 40 generates the new identification information. Meanwhile, the association storing module 60 associatively stores the new identification information and the re-issued rule of generating identification information, meanwhile the process module 50 uses the new identification information as the current identification information. In that case, the previous identification information can be continuously stored or canceled directly.

In the embodiment, when the re-issued rule fails to match with the pre-stored rule, the generation module 40 generates new identification information and the process module 50 uses the new identification information as the current identification information, ensuring the identification information of the terminal changes with the change of rule of generating identification information.

It is to be noted that, in hardware implementation, the collection module 10, the storage module 20, the update module 30, the generation module 40, and the process module can be embedded in the device for generating identification information as hardware or independent from the device for generating identification information, or stored in a memory of the device for generating identification information such that a processor can execute these modules to perform corresponding operations. The processor can be a central processing unit (CPU), a micro-processor, or a single chip, etc.

Figure 8:
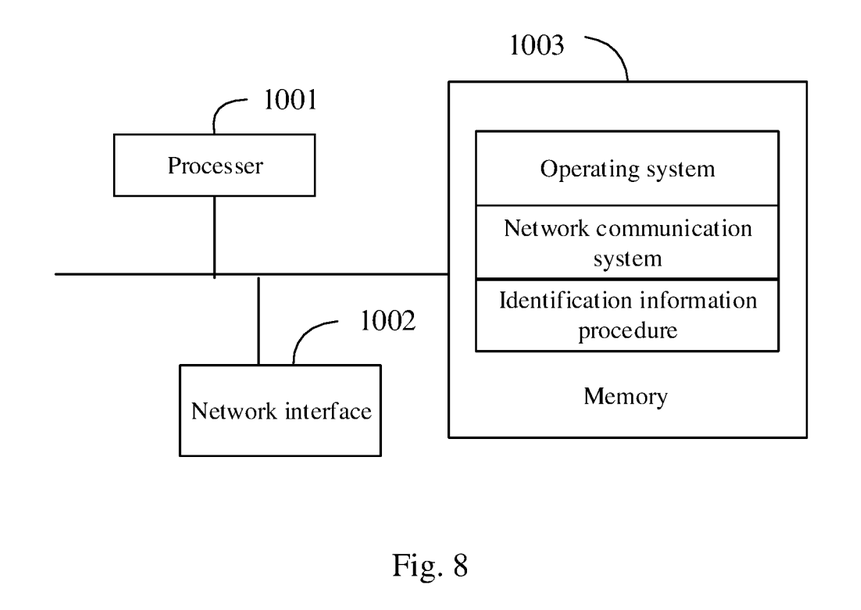
FIG. 8 is a schematic view of an apparatus for generating identification information showing hardware implementation environment of the method and device of the above embodiments.

FIG. 8 is a schematic view of an apparatus for generating identification information showing hardware implementation environment of the method and device of the above embodiments.

In some embodiments, the apparatus for generating identification information can be a personal computer, a smart mobile phone, a tablet computer, an e-reader, or a portable computer terminal, etc.

Referring to FIG. 8, the apparatus for generating identification information includes a processor 1001, e.g. a CPU, a network interface 1002, and a storage medium 1003. The processor 1001, the network interface 1002, and the storage medium 1003 communicate with each other through a system bus. The network interface 1002 can be a standard wired interface or a wireless interface (e.g., a WI-FI interface). The storage medium 1003 can be a high speed RAM or a stable non-volatile memory such as a disk memory.

In other embodiments, the apparatus for generating identification information may further include a user interface, a camera, a radio frequency (RF) circuit, a sensor, an audio circuit, and a WIFI module. The user interface may include a display, an input unit such as a keyboard. It is understood that the user interface can be wired or wireless.

It is understood that the structure shown in FIG. 8 does not intend to limit the apparatus for generating identification information to this embodiment. In other embodiments, the apparatus for generating identification information may include more or less components, or combine some components, or have a different arrangement of these components.

The storage medium 1003 may store an operation system, a network communication module, and an identification generation information program. The operation system includes programs for managing and controlling hardware and software of the apparatus for generating identification information, thereby supporting the operation and execution of the network communication module, the identification information generation program, and other programs. The network communication module is configured for managing and controlling the network interface 1002.

The network interface 1002 is configured for connecting and communicating with a server, wherein the server stores a rule of generating identification information. The processor 1001 is configured for executing the identification information generation program stored in the storage medium 1003 to perform following steps:

when a terminal receives a data acquisition instruction from the server, collecting data according to the data acquisition instruction;

storing the collected data, and updating the data to the server, allowing the server to issue a rule of generating identification information;

generating the identification information of the terminal according to the data and the rule of generating identification information when the rule of generating identification information from the server is received; and storing the identification information such that the stored identification information becomes current identification information if later an instruction of installing application is detected, wherein, if the rule of generating the identification information is invariant, the identification information is invariant.

In an embodiment, under the circumstances that the collected data is an MAC address of the terminal, the processor 1001 is configured for executing the identification information generation program stored in the storage medium 1003, such that the step of generating the identification information of the terminal according to the data and the rule of generating identification information when the rule of generating identification information from the server is received includes:

if the rule of generating identification information is directly using the MAC address of the terminal, hence the identification information of the terminal is the MAC address of the terminal;

if the rule of generating identification information is encrypting the MAC address of the terminal, then encrypting the MAC address of the terminal by means of a pre-stored encryption algorithm to generate the identification information of the terminal.

In an embodiment, the processor 1001 is configured for executing the identification information generation program stored in the storage medium 1003 to perform a following step after the step of generating the identification information of the terminal according to the data and the rule of generating identification information when the rule of generating identification information from the server is received:

associatively storing the identification information of the terminal and the rule of generating identification information received from the server.

In an embodiment, the processor is configured for executing the identification information generation program to perform following steps after the step of associatively storing the identification information of the terminal and the rule of generating identification information from the server:

when detecting that the server re-issues the rule of generating identification information, judging whether the re-issued generation rule matches with a pre-stored rule of generating identification information; and if the re-issued generation rule matches with the pre-stored rule of generating identification information, using the identification information associated with the pre-stored rule of generating identification information as the current identification information.

In an embodiment, the processor 1001 is configured for executing the identification information generation program stored in the storage medium 1003 to perform following steps after the step of judging whether the re-issued generation rule matches with the pre-stored rule of generating identification information:

if the re-issued rule fails to match with the pre-stored rule of generating identification information, then generating new identification information according to the re-issued rule; and associatively storing the new identification information and the re-issued rule, and using the new identification information as the current identification information.

The present disclosure further provides a computer-readable storage medium. One or more programs are stored thereon, which, when being executed by one or more processors, cause the one or more processors to perform following steps:

when a terminal receives a data acquisition instruction from a server, collecting data according to the data acquisition instruction;

storing the collected data, and updating the data to the server, allowing the server to issue a rule of generating identification information;

generating the identification information of the terminal according to the data and the rule of generating identification information when the rule of generating identification information from the server is received; and storing the identification information such that the stored identification information becomes current identification information if later an instruction of installing application is detected, wherein, if the rule of generating the identification information is invariant, the identification information is invariant.

In an embodiment, under the circumstances that the collected data is an MAC address of the terminal, the one or more programs cause the one or more processors to perform a following step when being executed by the one or more processors, such that the step of generating the identification information of the terminal according to the data and the rule of generating identification information when the rule of generating identification information from the server is received includes:

if the rule of generating identification information is directly using the MAC address of the terminal, hence the identification information of the terminal is the MAC address of the terminal; and if the rule of generating identification information is encrypting the MAC address of the terminal, then encrypting the MAC address of the terminal by means of a pre-stored encryption algorithm to generate the identification information of the terminal.

In an embodiment, when being executed by the one or more processors, the one or more programs cause the one or more processors to perform a following step after the step of generating the identification information of the terminal according to the data and the rule of generating identification information when the rule of generating identification information from the server is received:

associatively storing the identification information of the terminal and the rule of generating identification information received from the server.

In an embodiment, when being executed by the one or more processors, the one or more programs cause the one or more processors to perform following steps after the step of associatively storing the identification information of the terminal and the rule of generating identification information from the server:

when detecting that the server re-issues the rule of generating identification information, judging whether the re-issued generation rule matches with a pre-stored rule of generating identification information; and if the re-issued generation rule matches with the pre-stored rule of generating identification information, using the identification information associated with the pre-stored rule of generating identification information as the current identification information.

In an embodiment, when being executed by the one or more processors, the one or more programs cause the one or more processors to perform following steps after the step of judging whether the re-issued generation rule matches with the pre-stored rule of generating identification information:

if the re-issued rule fails to match with the pre-stored rule of generating identification information, then generating new identification information according to the re-issued rule; and associatively storing the new identification information and the re-issued rule, and using the new identification information as the current identification information.

It is to be noted that the term "including", "comprising", or any other variation thereof is intended to encompass a non-exclusive inclusion herein so that a process, method, article, or device including/comprising a set of elements includes not only the stated elements, but other elements not expressly listed, or elements inherent to such processes, methods, articles, or devices. In the absence of further limitations, the elements defined by the phrase "including/comprising one . . . " do not preclude the presence of additional identical elements in the process, method, article, or apparatus that includes the element.

The embodiments of the present disclosure have been described for purposes of illustration only and are not to be intended as representing the pros and cons of the embodiments.

It will be apparent to those skilled in the art from the foregoing description that the embodiments described above may be implemented by means of software plus the necessary general-purpose hardware platform. Although the embodiments described above may also be implemented by hardware, the former would be advantageous in many cases. On the basis of such an understanding, the substantial technical solution, or the part which contributes to the prior art, or all or part of the technical solution, of the disclosure, may be embodied as software products. Computer software products can be stored in a storage medium, e.g., ROM/RAM, magnetic disk, or optical disk, and can include multiple instructions causing a terminal device, e.g., a mobile phone, a computer, a server, a conditioner, a network device, etc., to execute all or part of the methods as described herein in various embodiments.

The foregoing descriptions are merely embodiments of the present invention, and are not intended to limit the scope of the present invention. An equivalent structural or equivalent process alternation made by using the content of the specification and drawings of the present invention, or an application of the content of the specification and drawings directly or indirectly to another related technical field, shall fall within the protection scope of the present invention.

What is claimed is:

1. A method for generating identification information comprising:

when a terminal receives a data acquisition instruction from a server, collecting data according to the data acquisition instruction;

storing the collected data, and updating the data to the server, allowing the server to issue a rule of generating identification information;

generating the identification information of the terminal according to the data and the rule of generating identification information when the rule of generating identification information from the server is received; and storing the identification information such that the stored identification information becomes current identification information if later an instruction of installing application is detected, wherein, if the rule of generating the identification information is invariant, the identification information is invariant.

2. The method for generating identification information of claim 1, wherein under the circumstances that the collected data is an MAC address of the terminal, the step of generating the identification information of the terminal according to the data and the rule of generating identification information when the rule of generating identification information from the server is received comprises:
  if the rule of generating identification information is directly using the MAC address of the terminal, hence the identification information of the terminal is the MAC address of the terminal; and
  if the rule of generating identification information is encrypting the MAC address of the terminal, then encrypting the MAC address of the terminal by means of a pre-stored encryption algorithm to generate the identification information of the terminal.

3. The method for generating identification information of claim 1, wherein after the step of generating the identification information of the terminal according to the data and the rule of generating identification information when the rule of generating identification information from the server is received, the method for generating identification information further comprises:
  associatively storing the identification information of the terminal and the rule of generating identification information received from the server.

4. The method for generating identification information of claim 3, wherein after the step of associatively storing the identification information of the terminal and the rule of generating identification information from the server, the method for generating identification information further comprises:
  when detecting that the server re-issues the rule of generating identification information, judging whether the re-issued generation rule matches with a pre-stored rule of generating identification information; and
  if the re-issued generation rule matches with the pre-stored rule of generating identification information, using the identification information associated with the pre-stored rule of generating identification information as the current identification information.

5. The method for generating identification information of claim 4, wherein after the step of judging whether the re-issued generation rule matches with the pre-stored rule of generating identification information, the method for generating identification information further comprises:
  if the re-issued rule fails to match with the pre-stored rule of generating identification information, then generating new identification information according to the re-issued rule;
  associatively storing the new identification information and the re-issued rule, and using the new identification information as the current identification information.

6. A device for generating identification information comprising:
  a collection module, configured for collecting data according to a data acquisition instruction when receiving the data acquisition instruction from the server;
  a storage module, configured for storing the collected data;
  an update module, configured for updating the data to the server, allowing the server to issue a rule of generating identification information;
  a generation module, configured for generating the identification information of the terminal according to the data and the rule of generating identification information when the rule of generating identification information issued by the server is received;
  the storage module being further configured for storing the generated identification information; and
  a process module, configured for using the stored identification information as current identification information if an instruction of installing application is detected, wherein, if the rule of generating the identification information is invariant, the identification information is invariant.

7. The device for generating identification information of claim 6, wherein when the collected data is a MAC address of a terminal, the generation module is further configured for:
  if the rule of generating identification information is directly using the MAC address of the terminal, then the MAC address of the terminal is used as the identification information of the terminal;
  if the rule of generating identification information is encrypting the MAC address of the terminal, then encrypting the MAC address of the terminal by means of a pre-stored encryption algorithm to generate the identification information of the terminal.

8. The device for generating identification information of claim 6, wherein the device for generating identification information further comprises:
  an association storing module, configured for associatively storing the identification information of the terminal and the rule of generating identification information received from the server.

9. The device for generating identification information of claim 8, wherein the device for generating identification information further comprises:
  a judge module, configured for, when the server re-issues the rule of generating identification information, judging whether the re-issued rule matches with a pre-stored rule of generating identification information;
  wherein the process module is configured for, if the re-issued rule matches with the pre-stored rule of generating identification information, using the identification information associated with the pre-stored rule of generating identification information as the current identification information.

10. The device for generating identification information of claim 9, wherein
  the generation module is further configured for if the re-issued rule fails to match with the pre-stored rule of generating identification information, then generating new identification information according to the re-issued rule;
  the association storing module is further configured for associatively storing the new identification information and the re-issued rule of generating identification information; and
  the process module is configured for using the new identification information as the current identification information.

11. An apparatus for generating identification information, wherein the apparatus for generating identification information comprises a processor, a network interface, and a storage medium;
  the storage medium stores an identification information generation program;
  the network interface is connected with a server and communicating with the server, wherein the server stores a rule of generating identification information;
  the processor is configured for executing the identification information generation program to perform following steps:

when a terminal receives a data acquisition instruction from the server, collecting data according to the data acquisition instruction;

storing the collected data, and updating the data to the server, allowing the server to issue a rule of generating identification information;

generating the identification information of the terminal according to the data and the rule of generating identification information when the rule of generating identification information from the server is received; and storing the identification information such that the stored identification information becomes current identification information if later an instruction of installing application is detected, wherein, if the rule of generating the identification information is invariant, the identification information is invariant.

12. The apparatus for generating identification information of claim 11, wherein under the circumstances that the collected data is an MAC address of the terminal, the processor is configured for executing the identification information generation program, such that the step of generating the identification information of the terminal according to the data and the rule of generating identification information when the rule of generating identification information from the server is received comprises:

if the rule of generating identification information is directly using the MAC address of the terminal, hence the identification information of the terminal is the MAC address of the terminal; and if the rule of generating identification information is encrypting the MAC address of the terminal, then encrypting the MAC address of the terminal by means of a pre-stored encryption algorithm to generate the identification information of the terminal.

13. The apparatus for generating identification information of claim 11, wherein the processor is configured for executing the identification information generation program to perform a following step after the step of generating the identification information of the terminal according to the data and the rule of generating identification information when the rule of generating identification information from the server is received:

associatively storing the identification information of the terminal and the rule of generating identification information received from the server.

14. The apparatus for generating identification information of claim 13, wherein the processor is configured for executing the identification information generation program to perform following steps after the step of associatively storing the identification information of the terminal and the rule of generating identification information from the server:

when detecting that the server re-issues the rule of generating identification information, judging whether the re-issued generation rule matches with a pre-stored rule of generating identification information; and if the re-issued generation rule matches with the pre-stored rule of generating identification information, using the identification information associated with the pre-stored rule of generating identification information as the current identification information.

15. The apparatus for generating identification information of claim 14, wherein the processor is configured for executing the identification information generation program to perform following steps after the step of judging whether the re-issued generation rule matches with the pre-stored rule of generating identification information:

if the re-issued rule fails to match with the pre-stored rule of generating identification information, then generating new identification information according to the re-issued rule; and associatively storing the new identification information and the re-issued rule, and using the new identification information as the current identification information.

* * * * *